United States Patent [19]

Oltman et al.

[11] 3,869,918

[45] Mar. 11, 1975

[54] TEMPERATURE MEASUREMENT DEVICE

[75] Inventors: Billie G. Oltman, Worth; Keith F. Eckerman, Joliet; Gerald P. Romberg, Lisle; William Prepejchal, Downers Grove, all of Ill.

[73] Assignee: The United States of America as represented by the United States Atomic Energy Commission, Washington, D.C.

[22] Filed: Aug. 1, 1973

[21] Appl. No.: 384,680

[52] U.S. Cl................. 73/339 R, 250/337, 250/484
[51] Int. Cl. ............................................. G01k 11/20
[58] Field of Search........... 73/339 R, 356; 250/337, 250/484

[56] References Cited
UNITED STATES PATENTS
2,945,954   7/1960   Gaugler ................................ 73/356

OTHER PUBLICATIONS
"Thermoluminescent Dosimetry," by Cameron et al. Copyright 1968.

Primary Examiner—S. Clement Swisher
Assistant Examiner—Denis E. Corr
Attorney, Agent, or Firm—John A. Horan; Arthur A. Churm

[57] ABSTRACT

Thermoluminescent dosimeter (TLD) material is exposed to a known amount of radiation and then exposed to the environment where temperature measurements are to be taken. After a predetermined time period, the TLD material is read in a known manner to determine the amount of radiation energy remaining in the TLD material. The difference between the energy originally stored by irradiation and that remaining after exposure to the temperature of the environment is a measure of the average temperature of the environment during the exposure.

4 Claims, 7 Drawing Figures

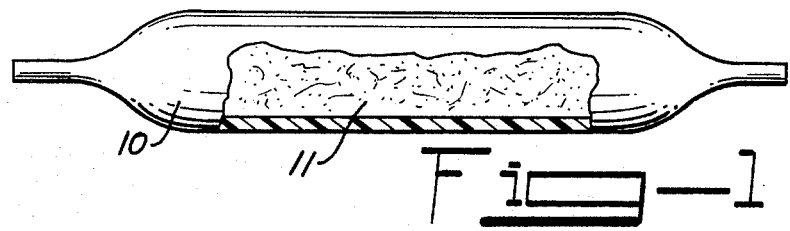
Fig-1
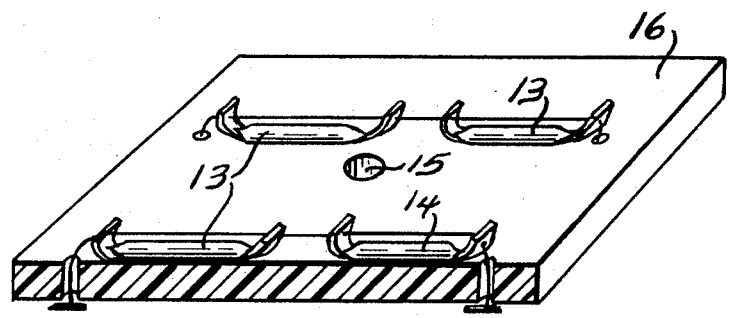
Fig-2
Fig-7
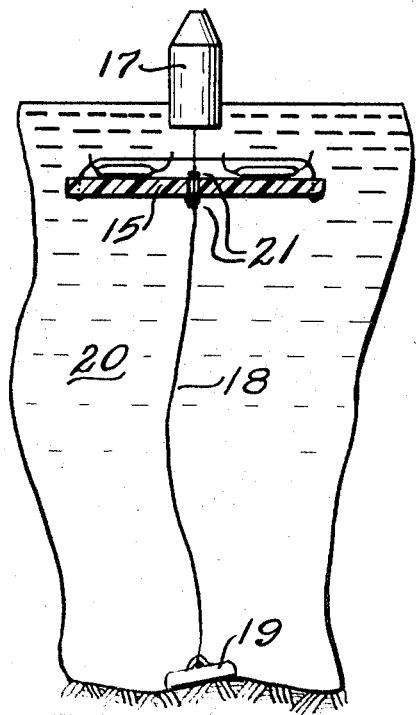
Fig-4
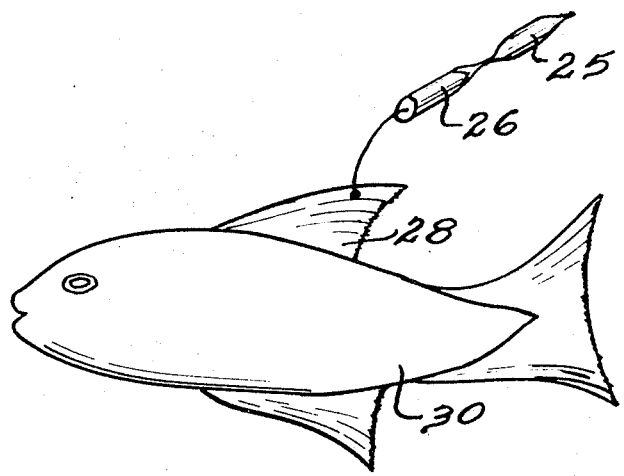

TEMPERATURE MEASUREMENT DEVICE

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

It is often desirable to take a large number of temperature measurements over a large area in order to determine temperature gradients and energy distribution throughout the area. This is particularly true in environmental work where the warm water of thermal discharges from nuclear and fossil-fueled electric plants is subject to study to determine the effects of the thermal energy therein on the environment. In order to determine accurately the temperature distribution, a large number of measurements are required which could require a relatively large number of expensive temperature-measuring instruments. It would be necessary to position the expensive instruments over a large area, much of which is relatively inaccessible.

In addition to the temperature measurements over selected areas, it is desirable to know the thermal exposure of marine life in the area, particularly fish, which can and do travel over a large area. The use of conventional temperature-measuring instruments to measure the temperature to which the fish are exposed is not practical because of both the expense involved and the size of the equipment.

It is therefore an object of this invention to provide an improved method of measuring temperature at a large number of locations over a wide area.

Another object of this invention is to provide a method by which the temperature to which small animals such as fish are exposed can be measured.

Another object of this invention is to provide a method of measuring temperature at a large number of positions and over a wide area which is simple and relatively inexpensive.

In practicing this invention, TLD material is irradiated with a known amount of irradiation. The irradiated TLD material is placed in the position where the temperature is to be measured for a predetermined period of time. The TLD material is then recovered and the radiation remaining is determined by measuring in a known manner. For example, see *Thermoluminescent Dosimetry*, J. R. Cameron, N. Suntharalingam and G. N. Kenney, The University of Wisconsin Press, 1968. The loss of radiation energy because of exposure to temperature during the predetermined time period is a measure of the temperature to which the TLD was exposed. Reference TLD material which has not been irradiated can also be combined with the irradiated TLD material to determine the amount of error caused by environmental radiation. The TLD material can be packaged in small packages so that it can be mechanically attached to animals such as fish to determine the thermal exposure to which the animal is subjected over the predetermined time period.

BRIEF DESCRIPTION OF THE DRAWINGS

The invention is described in the drawings, of which:

FIG. 1 is a cutaway view of a plastic container containing TLD material;

FIG. 2 shows the TLD material positioned on a plastic board for positioning at a desired location;

FIG. 4 shows the TLD material positioned in a fixed location in water;

FIG. 7 shows the TLD material of FIG. 5 attached to a fish.

DETAILED DESCRIPTION OF THE INVENTION

Referring to FIG. 1, there is shown a temperature-measuring device used with the system of this invention. The structure consists of a plastic tube 10 containing TLD material therein 11. Examples of TLD materials which are suitable for this system are $CaSO_4:Mn$ and $CaF_2:Dy$ in powder form.

Referring to FIG. 2, there is shown a plurality of the plastic containers containing the TLD material 13 and 14 mounted on a piece of plastic 16. While a plurality of TLD devices are shown, only one device is required for the carrying out of this measurement method. Hole 15 is used to mount the plastic 16.

In using this method, the TLD devices are first irradiated with a known amount of radiation so that energy is stored therein. Enough radiation is used so that after exposure to high temperatures the TLD devices will retain sufficient trapped energy to give accurate readings. Exposures of from 10 R to 100 R have been given to TLD devices used to measure temperatures in lake water. The devices are then positioned in the environment at a desired location for a predetermined period of time. The heat energy of the environment acts to release the stored radiant energy from the TLD devices at a rate which is a function of the ambient temperature. After exposure in the environment, the devices are exposed to heat and the remaining radiant energy stored therein then is measured by the amount of luminescence developed by the TLD device. This method of measuring the radiant energy stored in the TLD device is well known. The average ambient temperature of the environment can be determined by subtracting the remaining radiant energy from the original radiant energy stored in the TLD device to determine how much radiant energy was released by the heat in the environment. The average temperature of the environment can be determined by calibrating experimentally the TLD devices or theoretical calculations can be used to derive a formula for the average ambient temperature. One such empirical formula which is useful in determining the average ambient temperature to which the environment has been exposed is $$\overline{\Theta} = (\ln S_o/S - (\lambda_{(\theta)_R} - K\Theta)t)/kt \tag{1}$$

where
 $\overline{\Theta}$ is the average temperature,
 $S_o$ is the predosed TLD signal,
 $S$ is the TLD signal for an exposed device,
 $\lambda_{(\theta)_R}$ is the fade rate at the reference temperature $\Theta_R$,
 $\Theta_R$ is a reference temperature,
 $t$ is the time duration, and
 $k$ is Boltzman's constant.

In order to use equation (1), the early trap energies in the TLD devices must be removed so that only one trap energy level will be affected by exposure to the environment. In an example, the early trap energies were removed by exposure of the TLD devices to heat in an oven at 40°C. for 5 to 6 days. After this "aging" process the TLD devices were ready for exposure to measure the temperatures of a desired area.

Figure 3:
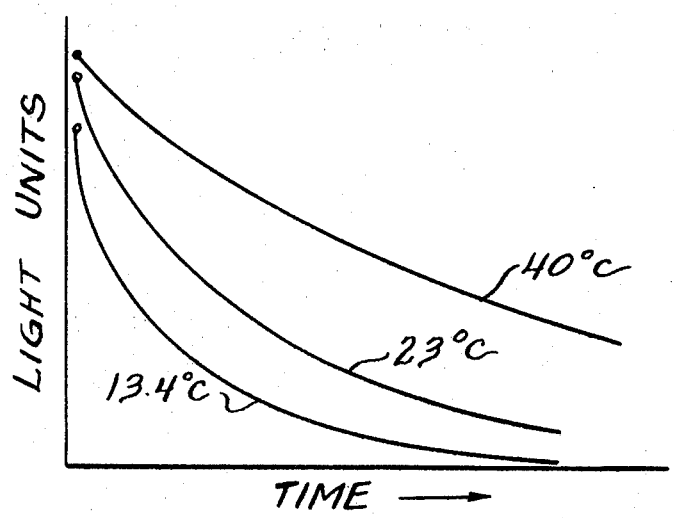
FIG. 3 is a plot of trapped energy loss vs. time.

Formula (1) was obtained empirically by measurements made with TLD devices. In an example, a number of "aged" TLD devices were placed in three ovens, one at 40°C., one at 23°C. and one at 13.4°C. This temperature range was chosen as these temperatures covered the temperature ranges expected in the area being measured. Each day a number of the TLD devices were removed from the ovens and the trapped energy loss measured. This was plotted as shown by the curves of FIG. 3 where the luminescence is arbitrary light units is plotted against time. In using formula (1) the reference temperature used is the temperature closest to the expected temperature range of the area measured. Where the temperature range is not known, some iteration may be necessary in using formula (1). Where the temperature of the area being measured is outside of the temperature range covered by the curves of FIG. 3, additional testing of the TLD devices would be required at different temperatures.

At least one of the TLD devices, for example 14 of FIG. 2, may be placed in the environment without being exposed to radiation. Thus, any radiant energy stored in the device 14 would be as a result of the background radiation of the environment. Where the background radiation of the environment might be heavy, a reference level can be established which can be used to correct the temperature obtained using the preirradiated TLD devices.

Referring to FIG. 4, there is shown a use of the structure of FIG. 2 in a water environment such as a lake or river. The plastic plate 16 containing the TLD devices is held in position by anchor 19, anchor line 18, and buoy 17 in a lake or other body of water 20. Anchor line 18 passes through hole 15 and knots 21 in the anchor line are used to secure the TLD devices at a desired depth. It can be seen that the device is extremely simple and very inexpensive in its structure. It is also very easy to use and place in position. Thus, a large number of these devices can be used to determine the thermal energy and temperature distribution over wide areas at a relatively low cost.

Figure 5:
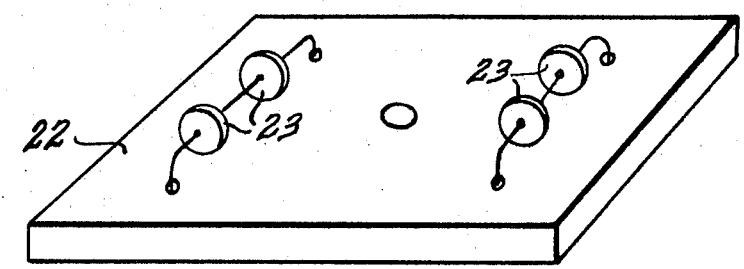
FIG. 5 shows an alternate form of TLD material which can be used.

Referring to FIG. 5, there is shown a plastic plate 22 containing disks 23. Disks 23 can be an alternate form of the device in which the TLD material is incorporated in TEFLON disks. This material is available and provides an alternate form of constructing the device.

Figure 6:
FIG. 6 shows a TLD material package suitable for attaching to animals.

Referring to FIG. 6, there is shown another structure in which the TLD material is contained in portion 25 of a sealed plastic tube. A plastic T-shaped hook structure 26 is mechanically fastened to the plastic tube. In FIG. 7, the plastic hook structure 26 and TLD material 25 are shown attached to the dorsal fin 28 of fish 30.

Movements of the fish 30 are not hampered by attachment of this device and the fish will thus take the TLD material over the environment through which the fish travels in the normal course of its life. By this means, the amount of thermal energy to which the fish is subjected can be measured and a determination can be made if the fish is receiving too much thermal energy.

The system which is described in this invention can be used with very simple, inexpensive devices. This permits the measurement of temperature and thermal energy distribution over large, relatively inaccessible areas. It also permits the measurement of the temperatures and thermal energy to which small animals, particularly fish, which travel in very inaccessible locations, are subjected. By this means, the environmental effects of thermal discharges into the environment, particularly water areas, can be studied more easily without the use of very expensive and cumbersome equipment.

The embodiments of the invention in which an exclusive property or privilege is claimed are defined as follows:

1. A method of measuring average ambient temperatures of an area including the steps of:
    a. irradiating a thermoluminescent dosimeter with a known amount of radiation,
    b. exposing the irradiated thermoluminescent dosimeter to the ambient temperature of the desired area for a given length of time,
    c. heating said exposed dosimeter to release energy stored therein as luminescence and measuring said luminescence, and
    d. determining the average temperature of the environment during said given length of time according to said known amount of radiation applied to the dosimeter and said measured luminescence.

2. The method of measuring the average ambient temperatures of an area of claim 1 wherein the thermoluminescent dosimeter is placed in a fixed position in the environment.

3. The method of measuring the average ambient temperatures of an area of claim 1 wherein the environment in which the thermoluminescent dosimeter is placed is a body of water and wherein the thermoluminescent dosimeter is attached to a fish which is free to travel throughout said body of water.

4. The method of measuring the average ambient temperatures of an area of claim 1 including the step of simultaneously exposing a reference thermoluminescent dosimeter which has not been preirradiated, heating said reference thermoluminescent dosimeter and measuring the luminescence given off, thereby determining the background radiation received by said reference luminescent dosimeter and correcting the average ambient temperature of the environment measured by said preirradiated thermoluminescent dosimeter for background radiation of the environment.

* * * * *